July 7, 1970  C. L. C. KAH, JR., ET AL  3,519,016
PRESSURE ACTUATED AND SEQUENCED VALVE ASSEMBLY
Filed Dec. 7, 1967  2 Sheets-Sheet 1
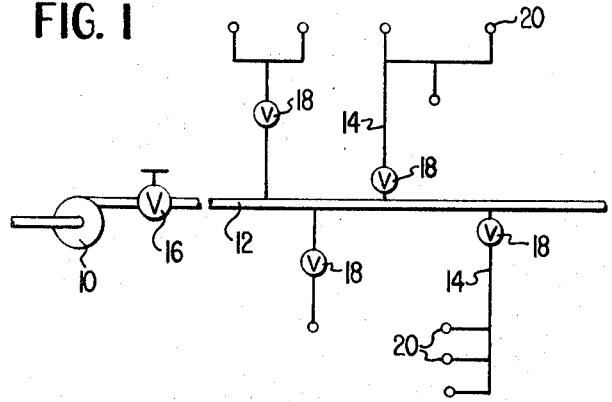
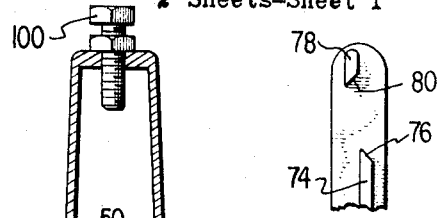
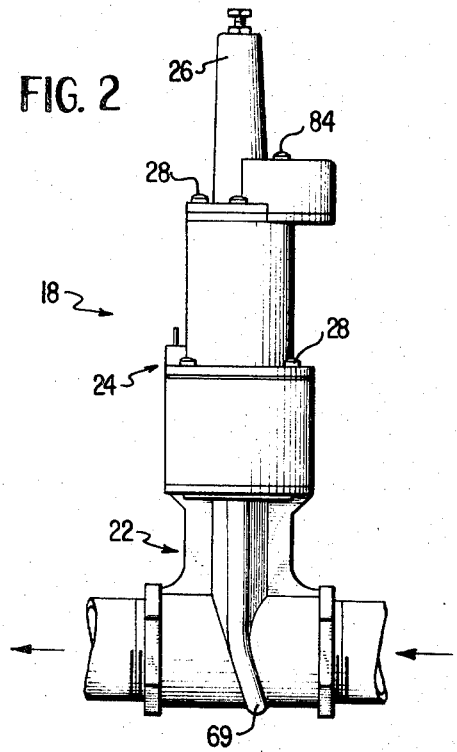
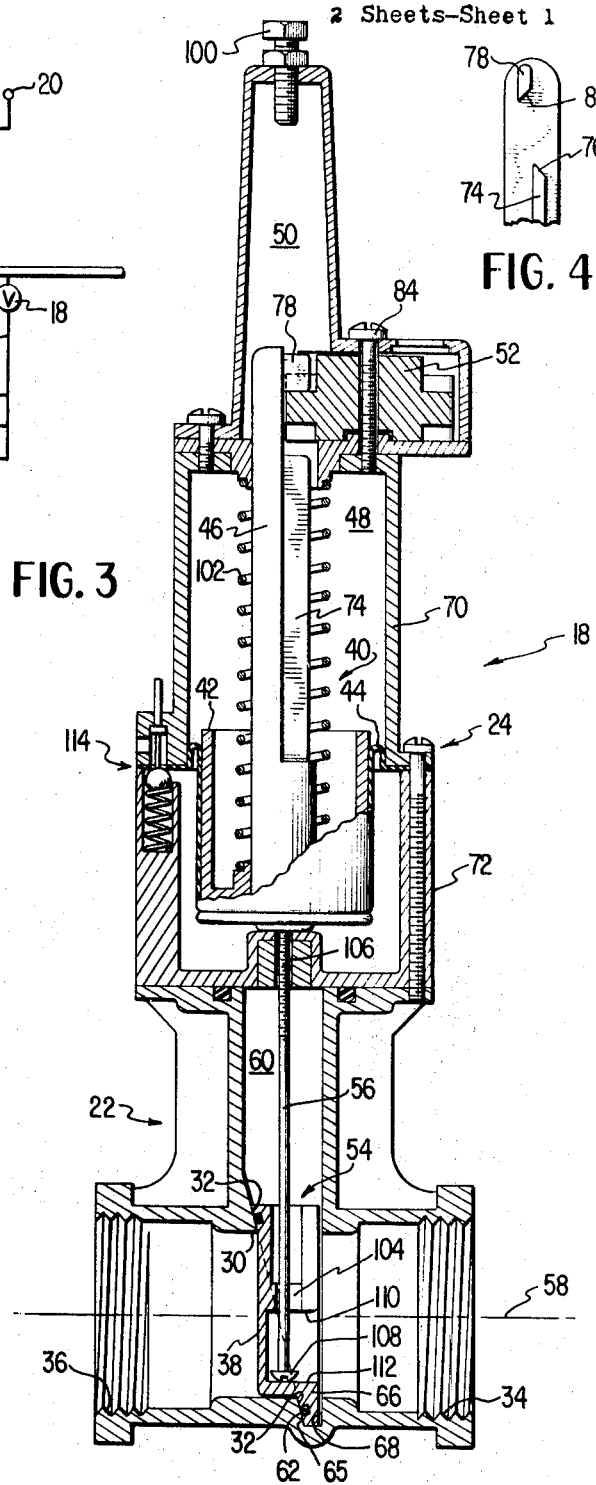
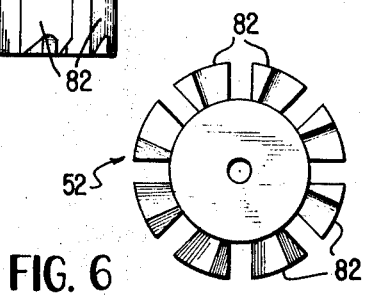
INVENTORS.
CARL L. C. KAH, JR.
ROGER D. SLAGEL
BY *Colton + Stone*
ATTORNEYS.

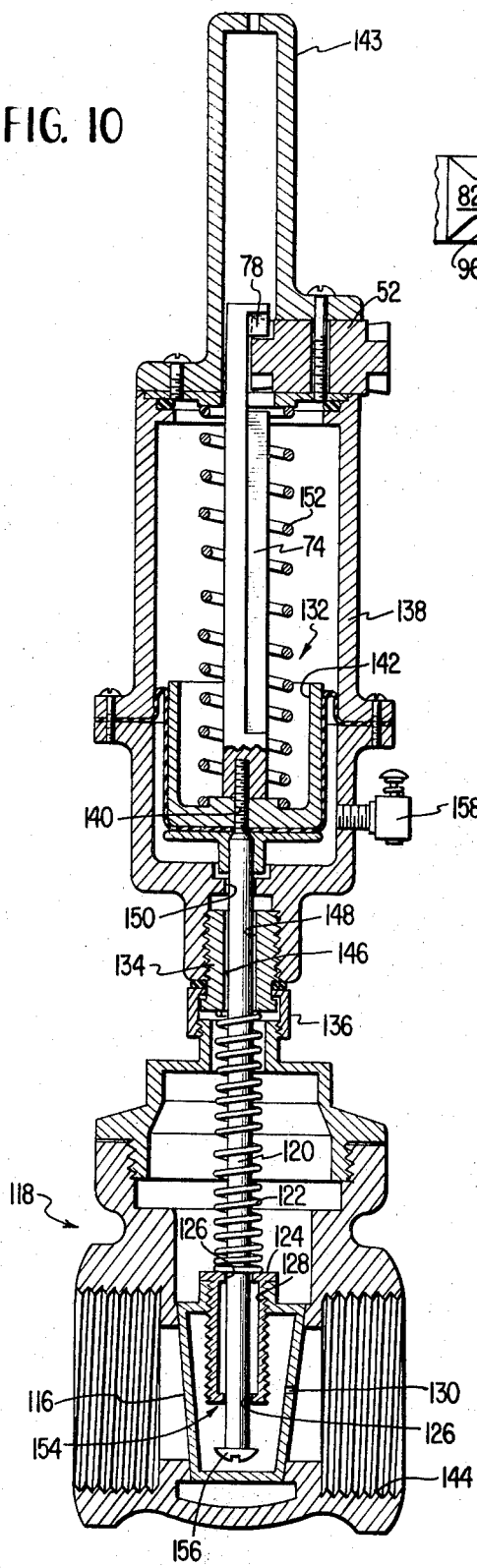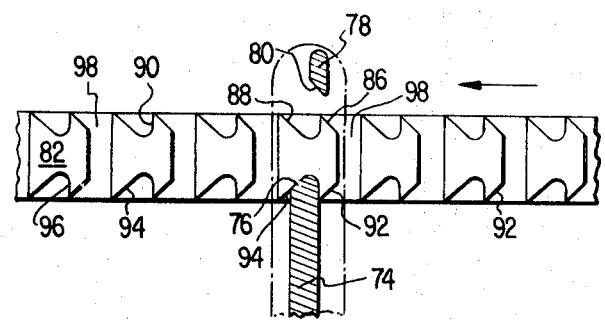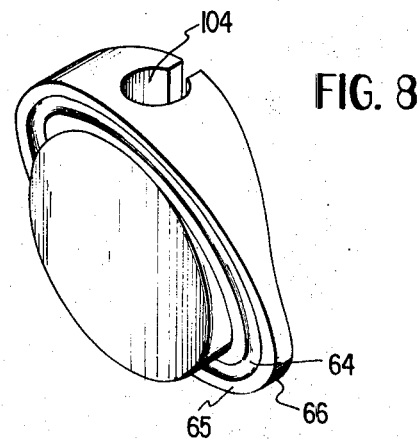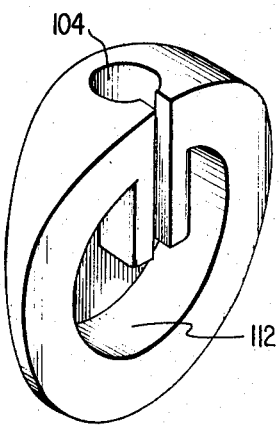

United States Patent Office 3,519,016
Patented July 7, 1970

3,519,016
PRESSURE ACTUATED AND SEQUENCED
VALVE ASSEMBLY
Carl L. C. Kah, Jr., Garden Villas Apartment, Plant Road, Apt. 138, and Roger D. Slagel, 294 Balsam St., both of Palm Beach Gardens, Fla.
Filed Dec. 7, 1967, Ser. No. 688,901
Int. Cl. A01g 25/02
U.S. Cl. 137—624.18                       6 Claims

ABSTRACT OF THE DISCLOSURE

The disclosure is directed to a pressure actuated and sequenced valve assembly for fluid conduits wherein variations in line pressure are utilized to control fluid flow through a conduit in a predetermined cyclic fashion. The assembly includes a stepping or indexing member which is sequentially indexed through a predetermined cycle by variations in line pressure. Cyclic line pressure variations are transmitted to a piston assembly which actuates the indexing member which member, in turn, controls the stroke length of the piston assembly to prescribe at which point or points in the indexing cycle a flow control valve will be opened. A lost motion connection between the piston and flow control valve permits the piston assembly to move through less than its full stroke length, as controlled by the indexing member, without opening the valve. Accordingly, the valve may be cycled open in response to a desired number of line pressure variations for which the indexing member is programmed.

BACKGROUND OF THE INVENTION

In fluid distribution systems wherein a number of branch lines and/or sprinklers are to be supplied from a single source or main line conduit, it is usually desirable to provide a sequencing control in each of the branch lines so that only a predetermined number of these lines are open to fluid flow at a given time. Exemplary of such systems are a wide range of commercial irrigation systems including agricultural and recreational applications such as the irrigation of crops and golf courses as well as residential uses, such as in lawn sprinkling.

Inasmuch as normal line pressure is not usually sufficient to supply all the branch lines and/or sprinklers simultaneously, many prior proposals have been made for dealing with this problem. The earlier commercially successful proposals usually involved electrical and/or hydraulic control systems that required a separate control line connected to each valve. The obvious disadvantages in running two lines to each valve, the flow line and the control line, led to the development of line pressure actuated and sequenced valves in which the on-off valve control was derived from variations in line pressure which could be controlled from a single point in the main line as, for example, by controlling pump operation. It is a control system of this latter class that is the subject matter of the invention which represents improvements over previously known valves of the type disclosed in U.S. Pats. 2,793,908, 3,018,788, 3,147,770 and 3,241,569.

It is a primary object of the invention to provide a hydraulically actuated and sequenced valve wherein a single sequencing cam, that is readily replaceable by a differently programmed cam, is indexed by the same element that it controls. Such construction not only requires fewer parts than do the previously known assemblies of the type above referred to but, most importantly, it greatly reduces shelf inventory that must be maintained in order to provide a different sequencing program in response to varying irrigation requirements that may be due to geographical considerations, changes in line pressure, etc.

Another object of primary importance is to provide a novel valve configuration that combines the known advantages of both globe and gate valves.

It is among the further objects of the invention to provide a subassembly of the pressure actuated and sequenced valve that may be used to convert a conventional manually operated globe or gate valve into an automatically sequenced valve assembly in accordance with the teachings of the invention; to provide a valve that is self-cleaning; to provide a valve assembly that can be manually cycled to a predetermined position in its cycle; to provide a valve assembly that is virtually insensitive to downstream residual pressures due to adverse geographical conditions; to provide a valve assembly that utilizes a single reciprocating member to sequence an indexing member which indexing member also controls the stroke length of the reciprocating member; and to provide a valve assembly that utilizes a unique lost motion connection between a reciprocating piston member and valve to permit the valve to remain closed through a predetermined number of line pressure variations.

A feature of great importance in overcoming disadvantages in sequencing valves of the type shown in the above listed patents is in the use of a relatively small camming member which is susceptible of use in controlling a long stroke actuator of the type necesssarily used in conjunction with a full flow gate type valve.

SUMMARY OF THE INVENTION

The sequencing valve assembly herein disclosed utilizes line pressure variations to reciprocate a piston assembly which indexes a rotary sequencing cam one step for each movement of the piston assembly in either direction along a path of reciprocating movement. The rotary cam is provided with integral camming elements that are sequentially indexed into and out of intersecting relationship with the path of movement of the reciprocating piston assembly so that in one position of the sequencing cam the piston assembly may move through its entire stroke length and in another position the rotary cam acts as an abutment to limit the upward travel of the piston assembly while, at all times, permitting the same to move downwardly. A lost motion connection between the valve and piston assembly allows the valve to remain closed when the stroke length of the piston is arrested by the rotary cam.

A novel valve and seating arrangement is disclosed that involves positioning the valve seat in a plane that is angularly related both to the flow line axis and the axis of reciprocating valve movement whereby the valve may be fully opened to transmit full flow line pressure with virtually no pressure drop in a manner typical of gate valves. Because of the angular relationship of the valve seat, the valve may be provided with an O-ring seal that is not subjected to sliding engagement with the seat except through a very small fraction of the range of valve movement thus contributing to long life and making possible the use of cast rather than machined valves. Because of the angular relationship between the flow line axis and valve seat, the valve is clamped onto its seat by line pressure in a manner typical of a globe valve.

DESCRIPTION OF THE DRAWINGS

FIG. 1 is a schematic illustration of one irrigating system in which the pressure actuated and sequenced valve of this invention finds application;

FIG. 2 is an elevational view of a first embodiment of the invention shown connected in a flow line;

FIG. 3 is a cross-sectional elevational view of the pressure actuated and sequenced valve assembly shown in FIG. 2;

FIG. 4 is a fragmentary side elevational view of the upper end of the sequencing control rod shown in FIG. 3;

FIG. 5 is an elevational view of the rotary sequencing cam;

FIG. 6 is a top plan view thereof;

FIG. 7 is a developed elevation of the control rod and sequencing cam;

FIGS. 8 and 9 are perspective views of the valve shown in FIG. 3 as viewed from the downstream and upstream sides thereof, respectively; and FIG. 10 is cross-sectional elevation of a second embodiment of the invention.

DESCRIPTION OF THE PREFERRED EMBODIMENTS

A schematic representation of one irrigation system in which the pressure actuated and sequenced valve of this invention finds application is depicted in FIG. 1 wherein pump 10 supplies main conduit 12 and branch lines 14 through a control valve 16. Pressure actuated and sequenced valves 18 may be interposed between main line 12 and branch lines 14 or between the branch lines and sprinklers 20, as desired. Cyclic pressure variations may be induced in main line 12 by controlling the operation of pump 10 or control valve 16 in any desired manner such as by a single switch time clock arrangement.

One embodiment of a pressure actuated and sequenced valve 18, according to the invention, is depicted in FIGS. 2 and 3. Valve housing 22, actuator housing 24 and stroke control housing 26 are assembled by threaded fasteners 28 into a unit-handled casing structure. Control port 30, surrounded by valve seat 32, is interposed between threaded inlet and outlet openings 34, 36. Valve 38 is mounted in valve housing 22 for reciprocal movement between positions opening and closing control port 30. A piston assembly 40 including rigid piston 42, rolling diaphragm 44 and sequencing control rod 46 is mounted for reciprocal movement within cylinder chamber 48 provided in actuator housing 24. Stroke control housing 26 provides an extension 50 of cylinder 48 into which control rod 46 projects and defines an extension of the permissible path of reciprocal movement that may be traversed by the control rod for a purpose that will become subsequently apparent. A generally disc shaped sequencing cam 52 is rotatably mounted on the casing structure and intersects the reciprocal path of movement of control rod 46 within control housing 26. Control rod 46 and sequencing cam 52 are provided with cooperating cam surfaces whereby at least one rotary indexing movement is imparted to cam 52 by each reciprocating cycle of control rod 46 for the purpose of controlling the stroke length of the piston assembly and, concomitantly, the opening and closing movement of the valve. Valve 38 has a lost motion connection 54 with valve control rod 56 which is rigidly carried by the piston assembly. The purpose of the lost motion connection is to permit the valve to remain seated during a portion of the piston assembly travel along an intermediate portion of its stroke length and to actuate the same at opposite end portions of the stroke path.

A more complete understanding of the invention will be had from the following detailed description of the component parts making up the pressure actuated and sequenced valve shown in FIGS. 2 and 3.

Valve housing 22 is adapted to be threadedly coupled in a flow line and is herein illustrated as a straight flow through type valve wherein inlet and outlet ports 34, 36 are aligned with control port 30 having a straight flow line axis 58 extending centrally therethrough. Valve 38, whose external configuration is best shown in FIGS. 8 and 9, is mounted for reciprocation along a path that is generally perpendicular to flow line axis 58 between the lower port closing position shown in FIG. 3 and an upper position within valve housing recess 60 which recess is configured similarly to valve 38.

A primary feature of the invention resides in the particular configuration of the valve seat and valve sealing face in relation to the flow axis and axis of valve movement. The face of circular valve seat 32 lies in a plane that is angularly displaced both from the flow line axis and the reciprocal path of valve movement. O-ring 62 is positioned in valve groove 64 that occupies a plane parallel to the plane of the valve seat. Valve recess 60 is somewhat larger than valve 38 and receives the same loosely therein, in the upper position of the valve, to insure that the valve does not bind due to the accumulation of debris and to permit greater manufacturing tolerances. As valve 38 approaches the lower closed position of FIG. 3 it will be seen that the downstream inclined face 65 of flange portion 66 will engage inclined seat surface 32 to cam or guide the O-ring into sealing engagement therewith. Groove 68, configured similarly to flange portion 66, is formed within the lower generally tubular shaped portion of valve housing 22 in outer enlargement 69 and is slightly larger than the flange portion on the valve so that the valve may reach the substantially closed position of FIG. 3 before appreciable rubbing engagement between the O-ring and valve seat occurs. This construction contributes to long seal life and permits the parts to be cast rather than machined as in the case of the usual gate valve. It will be noted that the valve herein described possesses the desirable characteristics of both a gate and globe valve in that the same may be substantially completely removed from the flow path and is, in essence, clamped in the closed position by inlet line pressure to effect a tight seal between the O-ring and seat. This clamping action is effected when inlet line pressure forces the valve through the slight range of movement permitted, parallel to the flow axis, by the oversized relationship of the recess 60 and groove 68 to the mating valve portions. Specifically, the clamping action occurs when the upstream side of the valve moves away from the vertical wall formed in the valve housing and into engagement with the inclined seat.

Actuator housing 24 includes upper and lower housing sections 70, 72 between which are clamped the outer circumferential portion of rolling diaphragm 44 that is secured to piston 42 mounted for reciprocal movement within chamber 48. Sequencing control rod 46 is rigidly secured to piston 42 and extends upwardly therefrom into control housing 26. Control rod 46 has a lower spline or rib 74 extending throughout a major portion of its length and terminating short of the upper end thereof in an upwardly facing cam surface 76. An upper rib or spline 78 is formed integrally with the control rod and terminates at its lower end in a downwardly facing cam surface 80 that is angularly offset and vertically spaced from cam surface 76. Rotary sequencing cam 52 is provided with integrally formed camming elements 82 which extend into the space between cam surfaces 76 and 80 and is rotatably supported on the casing structure for rotary indexing movement about a pivot axis defined by threaded fasteners 84. Each camming element 82 is formed with a pair of upper cam surfaces 86, 88 joined by a wall 90 and a pair of lower cam surfaces 92, 94 joined by a generally vertical wall portion 96. The space 98 between individual camming elements 82 is sufficiently wide to permit spline 74 to extend upwardly therethrough. As control rod 46 is reciprocated in response to cyclic pressure changes, the sequencing cam is indexed one step each time the rod is moved upwardly or downwardly. The manner in which this indexing motion is imparted to rotary cam 52 will be readily apparent from an inspection of FIG. 7 wherein it will be seen that as rod 46 moves downwardly from the position of FIG. 7, upper spline cam surface 80 engages upper cam surface 86 on rotary cam 52 to index the same, to the left as viewed in FIG. 7, whereupon lower cam face 92 will move into position to be engaged by lower spline cam surface 76 as the rod again moves upwardly. During the following upward movement, the rotary cam is indexed further to bring a space 98 into alignment with lower spline 74 whereupon the same may pass upwardly through space 98 permitting rod 46 to move further upwardly into control housing 26 until its upward movement is arrested by engagement with threaded stroke adjusting member 100. Upon downward movement of rod 46, upper cam surface 80 engages upper cam surface 88 on the next adjacent camming element 82 to further index the rotary cam and position lower cam surface 94 in line with lower spline 74 and on the next upward stroke of the rod, upper cam surface 76 will engage lower cam face 94 to index the cam. It will be noted that the camming engagement between surfaces 76 and 94 does not result in aligning cam face 92 adjacent a space 98 with the lower spline since the same abuts the termination of cam surface 94 adjacent wall portion 96, which is the position shown in FIG. 7. Accordingly, it will be seen that with the particular camming arrangement herein illustrated, the rotary cam is indexed one step for each linear movement of the control rod and that on every other upward movement of the control rod, a cam face 92 adjacent the space 98 is brought into alignment with spline 74 allowing control rod 46 to extend upwardly throughout its full stroke length to open the valve.

The piston assembly and control rod are moved upwardly by inlet line pressure and downwardly by spring pressure exerted between actuator housing 24 and piston 42 by spring 102 upon a preselected drop in inlet pressure.

The shaft of headed valve control rod 56 extends through an oversize opening 104 on the upstream side of valve 38, through valve recess 60 through an oversize opening 106 in the actuator housing and is secured to the pressure side of piston assembly 40. Openings 104 and 106 are slightly larger than the valve control rod to provide a restricted flow path therethrough around the rod. Thus it will be apparent that in the valve closed position of FIG. 3, inlet line pressure is communicated through the opening in valve 38, valve recess 60 and opening 106 with the pressure side of the piston assembly. When sufficient line pressure is transmitted to piston assembly 40, the same moves upwardly against the bias of spring 102 and, throughout the initial portion of its stroke length, no motion is imparted to valve 38 because of lost motion connection 54. The relative travel permitted between valve control rod head 108 and abutment surface 110 on the control valve is selected to be greater than the upward travel undergone by piston assembly 40 in reaching the relative position shown by the lower spline in FIG. 7 so that, unless a cam face 92 adjacent a space 98 is aligned with spline 74, the valve will not open. When the rotary cam has been indexed, in the manner previously explained, to bring a space 98 into alignment with lower rib 74 the control rod may then move upwardly past the rotary cam to open the valve. The valve opening desired may be adjusted by limiting the upward stroke of the control rod by manipulating stroke adjuster 100. Upon a decrease in line pressure, spring 102 forces the piston assembly downwardly, thereby indexing the rotary cam one step and, at the lower end of its stroke length, head 108 of valve actuator rod 56 engages lower abutment surface 112 formed in the valve body to force the valve to its lowermost position, generally as shown in FIG. 3 whereupon it is in position to be tightly clamped against its valve seat by inlet line pressure. As previously explained the novel valve possesses desirable characteristics of both gate and globe valves. Unlike conventional globe valves previously used in pressure actuated and sequenced devices of the general type herein described, residual downstream pressure which may be due to unusual topographical installations, are neither communicated to the piston assembly nor enabled to exert an opening force on the valve.

Due to the loose fit between the valve and its recess, as the piston assembly moves downwardly, the valve also moves towards the closed position under the influence of gravity and will not normally be forced down by the valve actuator rod except through the last portion of its downward travel toward the position of FIG. 3. Although not required, a compression spring may, if desired, be positioned between piston assembly housing 24 and valve 38 to positively close the same when inlet pressure is reduced and the piston assembly moved downwardly.

Because of the relationship of rotary cam 52 to the splines formed on control rod 46, although each vertical movement of the control rod indexes the cam, valve 38 will be opened only on alternate upward movements of the piston assembly or, in other words, on alternate pressure increases at inlet opening 34. It is, of course, obvious that the valve could be made to open after any desired number of indexing steps merely by modifying cam elements 82 to provide a greater or lesser number of openings 98 than are shown in the drawings. For example, by providing a cam pattern of multiple blind cam surfaces such as formed by surface 94 and wall 96, around the circumference of sequencing cam 52, and providing only one opening 98, the valve would be opened only once for each complete revolution of the rotary sequencing cam.

A manually operated bleed is provided at 114 to permit manual cycling of the sequencing valve. Thus when inlet pressure is applied to port 34 to move the piston assembly upwardly, if bleed 114 be opened the pressure will bleed out and spring 102 will restore the piston assembly to the lower position and close the valve. Subsequent release of the manual bleed, to close off bleed flow therethrough, then allows inlet pressure to again elevate the piston assembly. By repeated manual actuation and release of bleed valve 114 the rotary cam may be sequenced or stepped to any desired position. The purpose of the manual cycling feature is to enable the valve assembly to be so correlated with other like valves that sequential pressure changes will open desired ones of the valves shown in FIG. 1 while maintaining the others closed.

In operation, assuming an initial valve closed low pressure condition as illustrated in FIG. 3; as line pressure builds, the pressure is transmitted to the undersurface of piston assembly 40 and, assuming a cam face 92 adjacent a space 98 on the rotary cam to be aligned with spline 74, the piston assembly is moved upwardly through its full stroke path to index the rotary cam and abut adjustment means 100 and open the valve. Upon a drop in inlet line pressure spring 102 forces the piston assembly downwardly bringing cam face 80 into engagement with rotary cam face 88 to index the same and force valve 38 to its lower position. On the next pressure surge, upward movement of the piston assembly is arrested by engagement of spline cam surface 76 with rotary cam surface 94 which indexes the cam but does not bring a space 98 into registration with the spline. This limited upward movement of the piston assembly is taken up in the lost motion connection 54 and the valve remains seated.

A modification of the invention enabling one to convert a conventional manually operated gate valve into a pressure actuated and sequenced valve is illustrated in FIG. 10. A conventional valve body equipped with the usual gate valve 116 from which the manual actuator has been removed is indicated generally at 118. Valve actuator rod 120 is assembled with spring 122 and fitting 124 to extend loosely through openings 126 provided in the fitting. Fitting 124 is then screwed into threaded opening 128 normally provided in valve 116. A restricted orifice 130 is then drilled in the upstream side of the valve if such orifice is not already formed therein. A piston actuator assembly 132, generally of the type described in connection with FIG. 3, is then secured to the original valve body 118 by assembling a ferrule 134, having an enlarged head, with the packing gland nut 136 originally provided with valve assembly 118. Piston actuator housing 138 is then screwed onto ferrule 134 after valve rod 120 is screwed into a tapped opening 140 in piston 142. If desired, stroke control housing 143 may be vented rather than being provided with a stroke adjuster similar to that shown at 100 in FIG. 3.

In operation, increased line pressure entering inlet port 144 is transmitted to the undersurface of piston assembly 132 via orifice 130, oversize valve rod openings 126 and a restricted flow path 146 defined between the rod and oversize openings 148, 150 in the ferrule and lower part of the piston assembly housing, respectively. As the pressure increases, piston assembly 132 moves upwardly, compressing spring 152, indexing cam 52 and, if a cam surface adjacent a space 98 on the rotary cam is not aligned with lower spline 76, is arrested in its upward stroke by abutment of spline 74 with the solid intersecting wall portion 96 generally as illustrated in FIG. 7. During this limited upward stroke, the lost motion connection 154 between the gate valve and valve rod permits the valve to remain seated due to its wedging engagement with the seat and the bias of spring 122. As line pressure decreases at the inlet port, spring 152 moves the piston assembly downward and upper spline 78 indexes the rotary cam to bring cam face 92 into alignment with lower spline cam face 76 whereupon the next upward stroke will index the cam to permit passage of spline 74 through an opening 98 so that the piston assembly may complete its full upward stroke to unseat valve 116 which is lifted off its seat by engagement of valve rod head 156 with the lower end of fitting 124. As line pressure again falls, the rotary cam is further indexed by the upper spline cam face 80, valve 116 seats and the above cycle is ready to be repeated to open the valve one time for every alternate line pressure increase. A manual sequencing control 158, similar to that shown in FIG. 3, may be used to preset the sequencing cycle as described in connection with the previous embodiment.

The ratio of pressure cycles to valve openings can be selected as desired merely by substituting different rotary cams provided with different numbers of openings 98 in relation to vertical wall potrions or abutments 96. Thus the rotary cam could be caused to index any desired number of times before bringing a cam surface adjacent an opening 98 into alignment with lower spline 74. An important feature of the invention is the ease with which the valve opening cycle may be adjusted. In both embodiments of the invention it is merely necessary to remove the control housing and substitute a different rotary cam to obtain great flexibility in dealing with varying sprinkler configurations and/or line pressures.

The self-cleaning action previously referred to is achieved by the reciprocal movement of the valve control rods 56, and 120 through the various oversize openings 104, 106 and 126, 150, respectively, through which they extend. Most of the debris that tends to pass upwardly into the piston assembly cylinder is precluded from doing so by the small flow passages formed between the control rods and these openings. Additionally, debris that collects adjacent these openings is scraped away by the movement of the rod against the sides of the openings.

In addition to the foregoing advantages, the valve assembly herein described may be used as a substitute for a solenoid actuated pilot valve in a conventional globe type sequencing system.

Although a number of modifications and advantages have been specifically enumerated, additional uses and modifications within the scope of the claims will undoubtedly be suggested to those skilled in the art.

We claim:
1. A sequencing valve assembly comprising; a casing defining inlet and outlet openings and a control port therebetween; means defining distinct paths of axial reciprocating movement for a valve controlling said port and a piston assembly, including axially spaced camming elements, for moving said valve; flow means communicating the inlet opening with the pressure side of said piston assembly; the path length of said piston assembly being longer than the path length of said valve; a lost motion connection between said piston assembly and said valve; a rotary sequencing cam including a plurality of discrete radially extending camming elements separated by equal circumferential spacing about the entire periphery of said cam; each of said last named camming elements including at least two distinct camming surfaces for respective camming engagement with said axially spaced camming elements, means mounting said sequencing cam for rotary indexing movement about an axis substantially parallel to and laterally spaced from the axis of said piston assembly and defining a rotary path of movement of said radially extending camming elements intersecting the reciprocating path of movement of said axially spaced camming elements, and the thickness of said rotary cam measured in the direction of said reciprocating movement being small in comparison to the path length of said piston assembly.

2. The valve assembly of claim 1 wherein each of said radially extending camming elements include at least four distinct camming surfaces.

3. The valve assembly of claim 1 including manually operated bleed means intercommunicating the pressure side of said piston assembly with the exterior of said casing for manually cycling the valve assembly.

4. The valve assembly of claim 1 wherein said lost motion connection includes a valve actuator rod rigidly secured to said piston assembly and extending through an opening in said casing, said rod defining with said opening a restricted flow path constituting the sole flow communication between the pressure side of said piston assembly and said inlet opening whereby the fluid pressure build-up to actuate said piston assembly is exerted through said valve actuator rod to clean debris from said restricted flow path.

5. The valve assembly of claim 1 wherein said casing includes a separable housing section housing said sequencing cam and providing a housing into which said piston assembly may be extended at one extremity of its stroke length.

6. The valve assembly of claim 5 wherein said separable housing section includes adjustable stop means for limiting the movement of said piston assembly at said one extremity of its stroke length.

References Cited

UNITED STATES PATENTS

| 2,793,908 | 5/1957 | Carver | 137—624.14 X |
| 2,870,987 | 1/1959 | Greenwood | 251—328 X |
| 3,241,569 | 3/1966 | Sully | 239—66X |

FOREIGN PATENTS 952,040  11/1956  Germany.

ALAN COHAN, Primary Examiner

U.S. Cl. X.R.

239—66